Nov. 21, 1967  S. L. BROADHEAD, JR  3,354,398
DIGITAL FREQUENCY COMPARATOR
Filed June 7, 1965  2 Sheets-Sheet 1
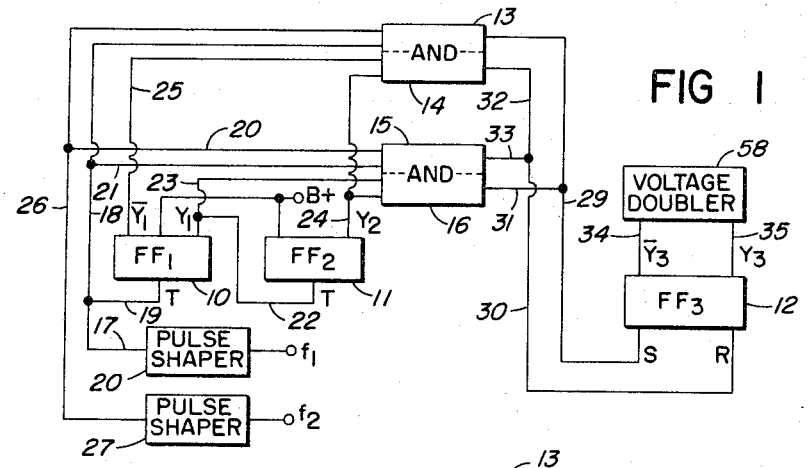
INVENTOR.
SAMUEL L. BROADHEAD JR.
BY
ATTORNEYS

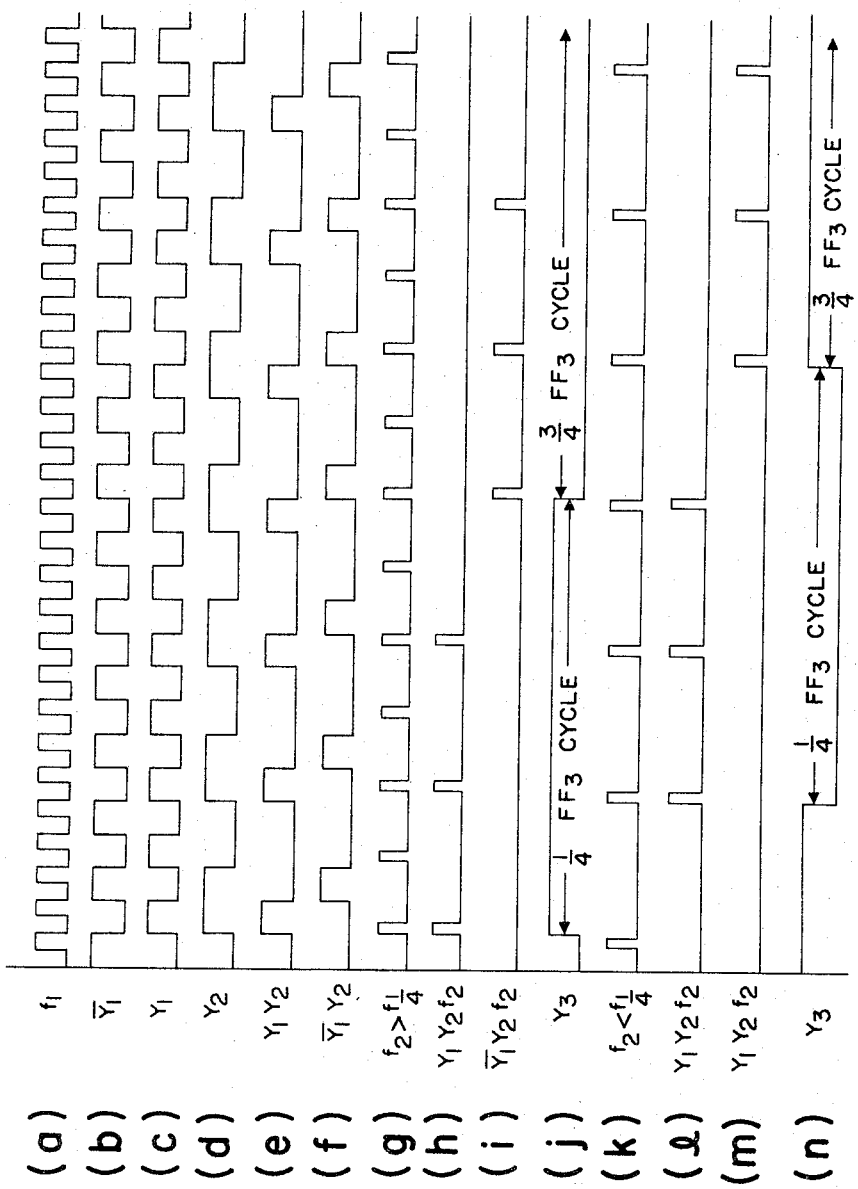

United States Patent Office 3,354,398
Patented Nov. 21, 1967

3,354,398
DIGITAL FREQUENCY COMPARATOR
Samuel L. Broadhead, Jr., Cedar Rapids, Iowa, assignor to Collins Radio Company, Cedar Rapids, Iowa, a corporation of Iowa
Filed June 7, 1965, Ser. No. 461,769
29 Claims. (Cl. 328—133)

ABSTRACT OF THE DISCLOSURE

This invention describes a digital frequency comparator which is independent of operating frequency over a wide range of frequencies. The incoming frequencies are injected into separate pulse shapers which convert the incoming signals into square wave pulse trains. One of the pulse trains is divided by a factor of four in a divider network. The initial pulse trains are then compared in a plurality of AND gates with the divided pulse trains to provide two output pulses. The output pulses are then applied to a determining circuit the output of which is a function of the difference between the two original frequencies. The output of the determining circuit is then detected and the magnitude and polarity of said output is used to determine the difference between the two frequencies.

This invention relates generally to a frequency comparator circuit and specifically to a digital frequency comparator which is independent of operating frequencies over a wide range.

Frequency comparators presently available generally depend upon the use of phase shift networks, or tuned circuits, for their operation. Phase shifting networks and tuned circuits are limited to a narrow frequency operating range, and consequently the frequency comparators in which they are employed are likewise limited. This unduly limits the operational abilities of the presently available frequency comparators. Also because these types of networks require a large number of inductors the prior art systems are not readily adaptable to miniaturization.

It is therefore an object of this invention to provide a digital frequency comparator which is free of inductors.

It is another object of this invention to provide such a frequency comparator which is independent of frequency over a very wide range.

Another object of this invention is to provide a frequency comparator which is readily miniaturized.

Another problem which faces many prior art devices is the accurate detection and measurement of low voltages without the use of expensive and cumbersome equipment. As is well known, the detection of low voltages is frequently difficult and often requires special equipment. Another problem exists when the output voltage is to be used to trigger another circuit. The circuit to be triggered may require a minimum voltage which exceeds the available output voltage. It is therefore another object of this invention to provide a voltage doubling circuit which permits a simple and accurate detection of low voltages, and which raises the available output voltage to a level enabling it to trigger a more varied and increased number of circuits.

Further objects, features and advantages of the invention will become apparent from the following description and claims when read in view of the accompanying drawings, wherein like reference numbers indicate like parts and in which:

FIGURE 1 shows a frequency comparator as contemplated by the present invention wherein two frequencies are compared at a ratio of 4:1;

FIGURE 2 shows a modification of the system wherein two frequencies are compared at a ratio of 1:1;

FIGURES 3(a) to (n) show the waveforms of various inputs and outputs of the system of FIGURE 1 and the composite figure is useful in explaining the operation of the system;

FIGURES 4(a) and (b) show the relationship of the two outputs of the comparator circuit;

FIGURE 5 shows a detailed schematic of the voltage doubling circuit; and

FIGURE 6 shows a modified AND gate connection.

Referring now to FIGURE 1 which shows a block diagram of the digital frequency comparator of the invention. The figure shows three standard flip-flop circuits, $FF_1$, $FF_2$, and $FF_3$. The flip-flops are NPN transistor circuits and are well-known in the art. Because the flip-flops are NPN they are driven by negative pulses. However, positive pulse driven PNP circuits can be used without changing the operation of the frequency comparator. Also shown in FIGURE 1 are four AND gates, 13, 14, 15, and 16. As is standard, each AND gate has two inputs and thereby each yields a single output which is the combination of the inputs. Two input leads 17 and 26 receive shaped pulse trains $f_1$ and $f_2$, respectively, from pulse shapers 20 and 27. The pulse shapers 20 and 27 are respectively fed by frequencies $f_1$ and $f_2$ which are to be compared. As shown, frequency $f_1$ is used to trigger flip-flop $FF_1$. This results in the two outputs $Y_1$ and $\overline{Y}_1$ or $FF_1$ each having a frequency equal to one half of frequency $f_1$. Also because $Y_1$ triggers $FF_2$ the output $Y_2$ of $FF_2$ is one half of $Y_1$, or actually one fourth of $f_1$. The second frequency $f_2$ is not fed into any flip-flop circuits; instead it goes directly to AND gates 13 and 15. For this reason the frequencies $f_1$ and $f_2$ are actually compared as $f_1/4$ and $f_2$, that is, at a 4:1 ratio. Flip-flop $FF_3$ is triggered by the outputs from the AND gates. The "Set" input S is triggered by the combined outputs of AND gates 13 and 16 while the "Reset" input R is triggered by the combined outputs of AND gates 14 and 15. As will be more fully explained hereinafter, when frequency $f_2$ exceeds ¼ of frequency $f_1$ ($f_2 > f_1/4$) the output $Y_3$ of $FF_3$ positive for ¼ cycle and negative for ¾ cycle. However, when frequency $f_2$ is less than ¼ of frequency $f_1$ ($f_2 < f_1/4$) the output $Y_3$ of $FF_3$ is negative for ¼ cycle and positive for ¾ cycle. It is therefore evident that the polarity of the $FF_3$ output is an indication of relative frequencies $f_1$ and $f_2$.

Referring now to FIGURES 1 and 3, FIGURE 1 shows two varying inputs of different frequencies $f_1$ and $f_2$. $f_1$ is fed into a first pulse shaper 20 to give a train of square pulses as shown in FIGURE 3(a). The pulse train $f_1$ is fed directly to AND gates 13 and 15. Pulse train $f_1$ is also fed via lines 17 and 19 to trigger flip-flop $FF_1$. The first output $\overline{Y}_1$ of $FF_1$ is fed to AND gate 14. The second output $Y_1$ is fed to AND gate 16 and also to the input of $FF_2$ via line 22. The output pulse trains $\overline{Y}_1$ and $Y_1$ are shown in FIGURES 3(b) and (c) respectively. As shown in the figure, they are 180° out of phase, or of opposite polarity, in accordance with the well-known operation of a flip-flop circuit. By triggering $FF_2$ with the output $Y_1$ of $FF_1$ an output $Y_2$ as shown in FIGURE 3(d) is obtained. Output $Y_2$ is fed to AND gates 14 and 16. It is now evident that AND gate 13 is simultaneously fed by pulse trains $f_1$ and $f_2$, AND gate 14 is fed by pulse trains $\overline{Y}_1$ and $Y_2$, AND gate 15 is fed by $f_2$ and $f_1$ and AND gate 16 is fed by $Y_1$ and $Y_2$. The output of AND gate 13 is therefore the combination of $f_1$ and $f_2$ and with $f_2$ less than $f_1/4$ the output pulse train will be similar to that shown in FIGURE 3(g).

This pulse train appears on line 29 of FIGURE 1. Line 29 is also fed by the output of AND gate 16. This output is a combination of $Y_1$ and $Y_2$, as shown in FIGURE 3(e).

Because the pulse train shown in FIGURES 3(e) and 3(g) both appear on line 29, the pulse train to the S input of $FF_3$ will be the combination of these two pulse trains. The resultant pulse train is shown in FIGURE 3(h). The pulse train of FIGURE 3(h) shows that a pulse is obtained each time a pulse from FIGURE 3(e) and 3(g) are coincident in time, that is, the first three pulses of FIGURE 3(e) coincide with the first three pulses of FIGURE 3(g) and the remaining pulses of the three figures do not coincide in time. For this reason, the three pulses shown in FIGURE 3(h) are obtained. The first of these three pulses triggers $FF_3$ so that the output of $FF_3$ runs positive. The output of $FF_3$ continues to run positive until triggered by the first pulse of the pulse train shown in FIGURE 3(i). After triggering by this pulse the output runs negative until triggered by the first pulse of FIGURE 3(h) as the pulse train is repeated. The explanation of how first pulse of FIGURE 3(i) is obtained by viewing FIGURES 3(f) and 3(g). FIGURE 3(f) is the output of AND gate 14 and is the combination of pulse train $\overline{Y}_1$ and $Y_2$. The output of AND 14 is applied to line 32 which also receives the output of AND 15. Because AND 15 receives the same inputs as AND 13 its output is identical thereto and is shown in FIGURE 3(g). Viewing FIGURES 3(f), (g) and (i), it is evident that the fourth, fifth and sixth pulses of FIGURES 3(f) and (g) coincide to give the three pulses shown in FIGURE 3(i) while the first three and the last pulses of FIGURES 3(f) and (g) do not coincide and therefore no pulses are obtained in pulse train 3(i) at these time intervals. The first pulse of the group shown in FIGURE 3(i) occurs after the last pulse of the group shown in FIGURE 3(h), therefore said first pulse triggers $FF_3$ to switch the output from positive to negative. The output continues negative until the first pulse of FIGURE 3(h) occurs as the cycle is repeated and the $FF_3$ output is switched back to positive.

It is therefore evident that the output $\overline{Y}_3$ of $FF_3$ will be positive for the first quarter cycle and negative for the last three quarter cycles. It should be noted that this is the output of the frequency comparator when $f_2$ is greater than $f_1/4$.

Assuming now that the frequency $f_2$ is less than $f_1/4$, the output of AND gates 13 and 15 will be similar to that shown in FIGURE 3(k).

By an analysis similar to that applied hereinto above but using the pulse train of FIGURE 3(k), a pulse train similar to that shown in FIGURE 3(l) will appear at the output of AND gate 16 and a pulse train similar to that shown in FIGURE 3(m) will appear at the output of AND gate 14. With these two pulse trains triggering the input of $FF_3$ an output similar to that shown in FIGURE 3(n) is obtained. This output is seen to be negative for one quarter of a cycle and positive for three quarters of a cycle. It is therefore evident that when frequency $f_2$ is less than one fourth of frequency $f_1$ a more positive output is obtained. It is now obvious that the polarity of the output of $FF_3$ is a direct indication of which of the two frequencies $f_2$ or $f_1/4$ is higher.

Referring now to FIGURE 2 which also shows flip-flops $FF_1$ and $FF_2$ and AND gates 13 and 14 connected in the same manner as shown in FIGURE 1. The modification of FIGURE 2 is the addition of flip-flops $FF_4$ and $FF_5$. By adding the latter two flip-flops the frequency $f_2$ is also divided by four by flip-flop $FF_4$ and $FF_5$ and consequently the frequencies $f_1$ and $f_2$ are compared on a 1:1 basis rather than the 4:1 basis of the circuit of FIGURE 1. With this exception the system shown in FIGURE 2 is identical to that shown in FIGURE 1 and the operation can be explained in a similar manner.

FIGURE 5 shows a circuit which can be used to double the effective output voltage of $FF_3$. FIGURE 5 shows flip-flop $FF_3$ and its two outputs $\overline{Y}_3$ and $Y_3$. Also shown are four identical capacitors 49, 50, 51, and 52, and two identical diodes 47 and 48. Diode 47 is serially connected between capacitors 49 and 50, and diode 48 is similarly connected between capacitors 51 and 52. It should be noted that the diodes are oppositely poled. The circuit also contains four identical resistors 54, 55, 56, and 57. Resistors 54 and 56 are serially connected between the cathode of diode 48 and the anode of diode 47, while resistors 55 and 57 are likewise connected between the cathode of diode 47 and anode of diode 48. A fifth capacitor 53 is connected between the junction of resistors 54 and 56 and the junction of resistors 55 and 57. This capacitor prevents a large surge on one side of the circuit from affecting the other side, and therefore has a capacity approximately ten times that of the other capacitors. The input sides of capacitors 49 and 51 are connected to line 34 and therefore receive output $\overline{Y}_3$ of flip-flop $FF_3$. The input sides of capacitors 50 and 52 are connected to line 35 and therefore receive the output $Y_3$ of flip-flop $FF_3$. The output $Y_3$ is shown in FIGURE 3(j). As expected the output $\overline{Y}_3$ is the opposite polarity of $Y_3$. FIGURE 4 shows the relationship of outputs $Y_3$ and $\overline{Y}_3$. The pulse train shown in FIGURE 4(a) is the same as that shown in FIGURE 3(j) but is drawn to a different time scale. However, it is evident that the output is positive for ¼ cycle and negative for ¾ cycle, as is the case of FIGURE 3(j). Line 34 is connected to both capacitors 49 and 51, while line 35 is connected to both capacitors 50 and 52. Capacitors 49 and 51 therefore obviously receive the $\overline{Y}_3$ pulse train while capacitors 50 and 52 receive the $Y_3$ pulse train. Because of the positioning of diodes 47 and 48, and also because the pulse train on line 34 is more negative than positive, junction 61 of capacitor 49 and diode 47 will have an effective voltage of $-6$ volts while the junction of capacitor 51 and diode 48 will have an effective voltage of $+2$. This results in a volage of $-4$ volts appearing at junction 63 of resistors 54 and 56.

With the waveform of FIGURE 4(b) applied to output $Y_3$ of flip-flop $FF_3$ this waveform is applied to capacitors 50 and 52 by line 35. Because the waveform of FIGURE 4(b) is more positive than negative an analysis similar to that previously explained results in a net voltage of $+4$ at junction 66 of resistors 55 and 57. It is, therefore, evident that an effective voltage drop of eight volts is felt across capacitor 53. By taking the output off one side of the capacitor and grounding the other, the voltage output of $FF_3$ has effectively been doubled. If desired, the grounded side of capacitor 53 can be subjected to any desired voltage which will then become a reference voltage with respect to the other terminal of capaictor 53.

The positive eight volt potential across capactor 53 is obtained because the frequency $f_2$ is greater than $f_1/4$. When $f_2$ is less than $f_1/4$ the pulse train of FIGURE 3 is obtained. When the pulse train is applied to lines 34 and 35 it is obvious that the voltages will be reversed in polarity. That is, the effective voltage at point 61 will be $+6$ volts and that at point 62 will be $-2$ volts, giving a net drop of $+4$ volts across resistors 54 and 56. By similar analysis point 66 will be $-4$ volts. This gives a net drop of $-8$ volts across capacitor 53. It is, therefore, now evident that the polarity of the voltage drop across capacitor 53 is a direct indication of the relationship between frequencies $f_2$ and $f_1/4$.

The use of the circuit shown in FIGURE 2 results in the polarity being an indication of the relationship of $f_1$ and $f_2$ directly. The circuit of FIGURE 1 therefore is seen to give a 4:1 comparison while that of FIGURE 2 gives a 1:1 comparison. Any ratio of comparison can be obtained by using the proper number of flip-flops in the two inputs. For example, by using two flip-flops in the $f_1$ input and one flip-flop in the $f_2$ input a 2:1 comparison can be made.

FIGURE 6 shows another means for combining the outputs of AND gates 13 and 14 or the outputs of AND gates 15 and 16. This is done simply for feeding the outputs of the two AND gates into a third AND gate 59, the output of AND gate 59 then being applied to line 29 or 30 and subsequently to the inputs S or R of flip-flops $FF_3$. This system works equally well with that shown in FIGURES 1 and 2 but is less desirable because it requires the use of four more diodes in the frequency comparator circuit.

Although this invention has been described with respect to particular embodiments thereof, it is not to be so limited, as changes and modifications may be made therein which are within the spirit and scope of the invention as defined by the appended claims.

I claim:

1. A frequency comparator comprising: a first signal receiving means and a second signal receiving means for receiving two signals of different frequencies to provide two outputs signals respectively having a first and a second frequency; first divider means for dividing at least one of said frequencies to provide a third and fourth output signal at a third frequency, said third and fourth outputs having different phases, second divider means for dividing said third frequency to provide a fifth output signal at a fourth frequency; four signal combining circuits, each of said combining circuits receiving two of said five output signals to provide two combined signals each of said five output signals going to at least one of said combining circuits, a determining circuit having two input terminals, each of said input terminals receiving one of said combined signals to provide an output from said determining circuit the polarity of which is dependent upon which of said combined signals has the highest frequency.

2. The comparator of claim 1 wherein said determining circuit has two outputs, the voltages of said outputs being of opposite polarity.

3. The comparator of claim 2 wherein said determining circuit outputs are connected to a voltage doubling circuit so that the voltage across said two outputs is doubled.

4. The comparator of claim 3 wherein said voltage doubling circuit includes two parallel paths connected between said determining circuit outputs, each of said paths containing a diode connected between capacitors, the diodes of the paths being similar and connected to be oppositely poled.

5. The comparator of claim 1 wherein said first and second divider means are flip-flops and said combining circuits are AND gates.

6. The comparator of claim 5 wherein said determining circuit is a flip-flop.

7. A frequency comparator comprising: a first circuit for receiving signals having a first frequency, a second circuit for receiving signals having a second frequency; a plurality of divider circuits, said divider circuits being connected such that one of said divider circuits is triggered by said first receiving circuit and the remaining divider circuits are successively triggered by the divider circuits which immediately precedes them, a plurality of combining circuits, each of said combining circuits receiving two inputs of different frequencies from said divider circuits and said receiving circuits, the outputs of a portion of said combining circuits going to a first common means to form a first combined signal, and the outputs of the other portion of said combining circuit going to a second common means to form a second combined signal; a determining circuit having two input means, the first input means being fed by said first combined signal and the second input being fed by said second combined signal, the polarity of the output of said determining circuit being indicative of which of said first and second frequencies is greater.

8. The comparator of claim 7 wherein said determining circuit has two outputs, the voltage of each of said outputs being of opposite polarity.

9. The comparator of claim 8 wherein said two determining circuit outputs are connected to a voltage doubling circuit so that the voltage across said two outputs is effectively doubled.

10. The comparator of claim 9 wherein said voltage doubling circuit includes two parallel paths, each of said paths containing a diode connected between capacitors, the diodes of both paths being similar and oppositely poled.

11. The comparator of claim 7 wherein said divider circuits are flip-flops and said combining circuits are AND gates.

12. The comparator of claim 11 wherein said determining circuit is a flip-flop.

13. A frequency comparator comprising: a first and a second input means, said first and second input means receiving a first and a second frequency respectively, said first and second frequencies being different; a first and a second divider circuit respectively connected to said first and second input means; first additional divider means connected to said first divider circuit; second additional divider means connected to said second divider circuit so that said first and second frequencies are divided down to lower frequencies, and so that said first divider circuit and said first additional divider means together provide a first set of output signals, and also so that said second divider circuit and said second additional divider means together provide a second set of output signals; a first plurality and a second plurality of combining circuits, each of said first combining circuits receiving two of said first set of output signals to provide a first combined signal, every output signal of said first set of output signals being received by at least one combining circuit of said first plurality of combining circuits, and each of said second combining circuits receiving two of said second set of output signals to provide a second combined signal; every output signal of said second set of output signals being received by at least one combining circuit of said second plurality of combining circuits, a determining circuit having two input terminals, one of said input terminals, receiving said first combined signal and the other input terminal receiving said second combined signal, the polarity of the output of said determining circuit being dependent upon which of said first or second frequency is higher.

14. The comparator of claim 13 wherein said determining circuit yields two signals, each of said signals being of opposite polarity.

15. The comparator of claim 14 wherein said two output signals are connected to a voltage doubling circuit.

16. The comparator of claim 15 wherein said doubling circuit includes two parallel paths, each of said paths containing a diode connected between capacitors, the diodes of both paths being similar and oppositely poled.

17. A voltage doubling circuit comprising: a pair of parallel paths connected between input terminals, each of said paths containing electron control means connected between capacitors, said electron control means being oppositely poled an output terminal connected between said electron control means.

18. The circuit of claim 17 including a first set of serially connected similar resistors connected between the positive pole of one of said electron control means and the negative pole of the other of said electron control means, and a second set of serially connected similar resistors connected between the other poles of said first and second electron control means, said output terminal being connected between two of said serially connected resistors.

19. The circuit of claim 18 wherein said electron control means are diodes.

20. The circuit of claim 19 wherein the capacitors in both branches are similar and the resistors in both serial connections are similar.

References Cited

UNITED STATES PATENTS

| | | | |
|---|---|---|---|
| 2,795,695 | 6/1957 | Raynsford | 328—133 |
| 3,090,922 | 5/1963 | Diggelmann | 328—72 |
| 3,210,565 | 10/1965 | Bowe et al. | 307—88.5 |
| 3,265,974 | 8/1966 | Thomas | 328—110 X |

ARTHUR GAUSS, *Primary Examiner.*

J. A. JORDAN, *Assistant Examiner.*